United States Patent
Artigue et al.

(10) Patent No.: US 6,233,383 B1
(45) Date of Patent: May 15, 2001

(54) METHOD OF ASSEMBLING AN OPTICAL MODULE

(75) Inventors: Claude Artigue, Bourg la Reine; Franck Mallecot, Montrough; Denis Tregoat, Gif sur Yvette; Anton Ambrosy, Tiefenbronn Allemagne, all of (FR)

(73) Assignee: Alcatel, Paris (FR)

( * ) Notice: Subject to any disclaimer, the term of this patent is extended or adjusted under 35 U.S.C. 154(b) by 0 days.

(21) Appl. No.: 09/292,305

(22) Filed: Apr. 15, 1999

(30) Foreign Application Priority Data

Apr. 16, 1998 (FR) .................................................. 98 04745

(51) Int. Cl.⁷ ...................................................... G02B 6/26
(52) U.S. Cl. ................................ 385/39; 385/49; 385/50; 385/52
(58) Field of Search .................................. 385/39, 49, 50, 385/52, 65, 83

(56) References Cited

U.S. PATENT DOCUMENTS

| | | | |
|---|---|---|---|
| 4,239,334 | * 12/1980 | Johnson | 385/64 |
| 4,323,300 | * 4/1982 | Stewart et al. | 385/65 |
| 5,909,523 | * 6/1999 | Sakaino et al. | 385/49 |
| 6,052,178 | * 4/2000 | Hirano | 356/73.1 |
| 6,052,500 | * 4/2000 | Takano et al. | 385/50 |

FOREIGN PATENT DOCUMENTS

| | | |
|---|---|---|
| 0 114 230 A1 | * 8/1984 | (EP) . |
| 0 716 321 A1 | 6/1996 | (EP) . |
| 4-161908 | 6/1992 | (JP) . |
| 5-249349 | 9/1993 | (JP) . |

OTHER PUBLICATIONS

C. A. Armiento et al, "Four–Channel, Long–Wavelength Transmitter Arrays Incorporating Passive Laser/Single mode–Fiber Alignment on Silicon Waferboard", Proceedings of the Electronic Components and Technology Conference (ECTC) San Diego May 18–20, 1992, No. Conf. 42 May 18, 1992, pp. 108–114, XP000473971, Institute of Electrical and Electronics Engineers.

Patent Abstracts of Japan, vol. 018, No. 557 (P–1817) Oct. 24, 1994 corresponding to JP 06 201930 A (Nippon Telegr & Teleph Corp) Jul. 22, 1994.

\* cited by examiner

*Primary Examiner*—John D. Lee
*Assistant Examiner*—Sarah Song
(74) *Attorney, Agent, or Firm*—Sughrue, Mion, Zinn, Macpeak & Seas, PLLC (57) ABSTRACT

A method is disclosed of assembling an optical module comprising at least two optical components whose waveguides are optically coupled to each other. Positioning one waveguide relative to the other one relies on two contact surfaces on the respective optical components cooperating with each other. A first contact surface includes a vertical bearing plane in the same horizontal plane as the optical axis of the waveguide of one of the optical components. A second contact surface includes a vertical bearing plane in the same horizontal plane as the optical axis of the waveguide of the other optical component.

19 Claims, 9 Drawing Sheets

PRIOR ART

FIG_1

PRIOR ART FIG_2A

FIG_2B

PRIOR ART

PRIOR ART FIG_3A

FIG_3B

PRIOR ART

PRIOR ART

FIG_4

FIG_5A PRIOR ART

FIG_5B PRIOR ART

FIG_6A PRIOR ART

FIG_6B PRIOR ART

FIG_7A  FIG_7B

FIG_8

FIG_9A  FIG_9B  FIG_9C  FIG_9D

FIG_10A  FIG_10B

FIG_11A  FIG_11B  FIG_11C  FIG_11D

FIG_12A  FIG_12B

FIG_13

METHOD OF ASSEMBLING AN OPTICAL MODULE

BACKGROUND OF THE INVENTION

1. Field of the Invention

The present invention concerns a method of assembling an optical module. An optical module is defined as an element comprising at least two optical components each including a waveguide, the two optical components being optically coupled to each other. A plurality of optical fibers can be connected to an optical module of the above kind.

2. Description of the Prior Art

Optical modules have already been produced in the prior art. One of the main problems to be solved in assembling such modules is aligning the waveguides of the various optical components to achieve high quality optical coupling.

The waveguides of optical components have very small dimensions. For example, a laser component 100 $\mu$m thick, 500 $\mu$m long and 250 $\mu$m wide has a waveguide buried in its structure that is in the order of 0.2 $\mu$m thick, 2 $\mu$m wide and 500 $\mu$m long, for example. A guide of the above kind must be aligned with another waveguide whose section also has small dimensions, for example in the order of 10 $\mu m^2$ or even less. The problem is therefore to align such waveguides having small dimensions, especially if they are surrounded by relatively bulky optical components.

The optical modules are generally produced either on a silicon (Si) support structure or on a silica-on-silicon ($SiO_2$/Si) support structure. FIGS. 1 to 3B are diagrammatic representations of various embodiments of conventional optical modules formed on an $SiO_2$/Si support structure. FIGS. 4 to 6B are diagrammatic representations of various embodiments of conventional optical modules formed on an Si support structure.

FIG. 1 is a diagrammatic exploded perspective view of a conventional optical module and FIGS. 2A and 2B are diagrammatic representations of the front face of two optical components respectively separate and then assembled in the optical module from FIG. 1. The module is formed on an $SiO_2$/Si support structure including a silicon substrate 1 onto which are stacked two silica layers 2, 3. The second silica layer 3 is etched to a particular shape, for example in the form of a beam, and constitutes an optical waveguide of a first optical component 30 integrated into the structure.

A trench 5 is defined in the silica layers 2, 3 and near the substrate 1 to accommodate a second optical component 6 including a waveguide 7. The second optical component can be a laser or an amplifier, for example, or a photodetector or any other active or passive component. It is placed in the trench 5 and fixed to the substrate 1, in the bottom of the trench, by means of a spot of solder S. It is disposed so that the optical axis A7 of its waveguide 7 is aligned with the optical axis A3 of the waveguide 3 of the first optical component 30.

Light is emitted perpendicularly to the front face of the module, along the axis designated x in the figures. The second optical component 6 is disposed in the trench 5 so that the optical axes of the waveguides 3 and 7 are vertically and horizontally aligned with the axes designated z and y, respectively.

A routine method of aligning the waveguides 3 and 7 is to control the height h of the spot of solder S. This is very difficult. Consequently, this method provides only approximate control of the height of the waveguide 7 of the second optical component 6 relative to the waveguide 3 of the first optical component 30. Also, this method cannot easily control transverse alignment of the waveguides, i.e. alignment along the y axis. Transverse alignment must therefore be carried out with the naked eye or optically (the alignment process is slow given the required level of accuracy) or by reflow of the solder (poor accuracy, in the order of 3 $\mu$m).

Figure 5A:
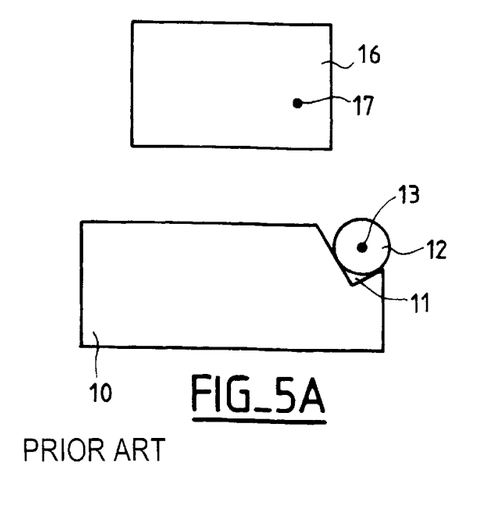
FIGS. 5A and 5B, already described, are diagrammatic representations of the front face of two optical components respectively separate and assembled in the optical module from FIG. 4.
Figure 5B:
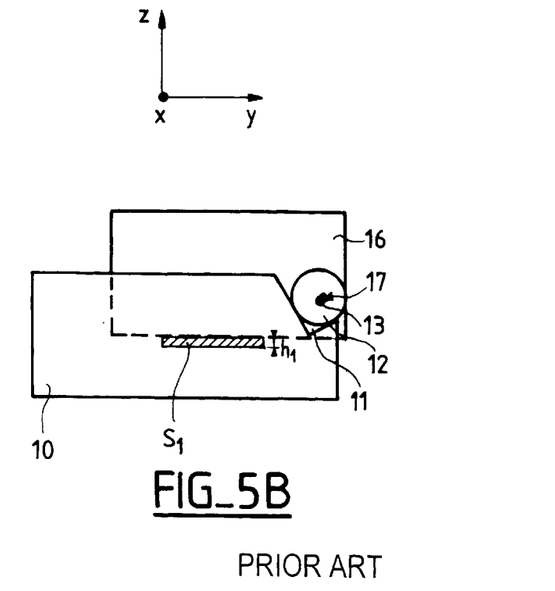

This assembly method relying on controlling the height h1 of the spot of solder S1 between the two optical components has also been used in modules produced on Si structures and as shown in FIGS. 4, 5A and 5B. FIG. 4 is a diagrammatic exploded perspective view of a module of this kind and FIGS. 5A and 5B are diagrammatic representations of the front face of the two optical components, respectively separate and then assembled in the module from FIG. 4. The module is produced on a silicon substrate 10 in which a V-shaped groove 11 is chemically etched to house an optical fiber 12. The optical fiber 12 includes a core 13 (optical waveguide) and forms the first optical component of the module. A trench 15 is formed in the Si substrate 10 to house a second optical component 16 including a waveguide 17.

Another solution has been proposed to improve the quality of the alignment of the waveguides and in particular to allow transverse alignment, along the y axis. This solution is shown diagrammatically in FIGS. 3A, 3B and 5A, 5B, which respectively correspond to the optical module formed on an $SiO_2$/Si support structure and to the optical module formed on an Si structure.

The solution consists in providing a first contact surface 8 (18) in the trench in the $SiO_2$/Si (Si) structure and a second contact surface 9 (19) on the second optical component 6 (16), the second contact surface 9 (19) being adopted to cooperate with the first contact surface 8 (18). In this case, alignment is no longer defined by the height of the spot of solder, which can therefore be less precise. The contact surfaces respectively define vertical bearing planes 8a (18a), 9a (19a) along the z axis and lateral planes 8b (18b), 9b (19b) along the y axis and it is the position of these bearing planes that controls the position of the waveguides relative to each other. The contact surface 8 is lithographically etched into the first silica layer 2 of the $SiO_2$/Si support structure after etching the guide 3 in the form of a beam.

As shown in FIGS. 3A, 3B and 6A, 6B, the second optical component 6 (16) is placed in the trench in the $SiO_2$/Si (Si) support structure so that its contact surface 9 (19) is pressed against the contact surface 8 (18) of the $SiO_2$/Si (Si) support structure. The position of the contact surface 8 (18) of the $SiO_2$/Si (Si) support structure is adjusted to align the waveguides 3 (13) and 7 (17) transversely, along the y axis, and vertically, along the z axis.

The surface of the $SiO_2$/Si support structure is generally defined at the level of the layer 2 near the silicon substrate 1.

This second solution cannot universally define the height of the etching. The position of the vertical bearing plane 8a (18a) of the support structure must be defined when assembling the module in accordance with the position of the woveguide 7 (17) relative to the bottom surface of the second optical component 6 (16). The height of the waveguide 7 (17) in the second optical component depends on the nature of that component and it would therefore seem difficult to control accurately the vertical alignment, along the z axis, of the waveguides 3, 7 of the two optical components.

Thus, unless penalizing constraints are introduced as to the transverse dimensions of the optical components, the above prior art solution cannot be used to align a plurality of optical components on a common structure; this would involve a plurality of successive etching operations in the support structure to define contact surfaces at different heights according to the position of the waveguide of each component.

Also, the smaller the waveguides, the more difficult it is to control alignment. Consequently, the assembly methods of the prior art cannot achieve accurate vertical alignment of the waveguides of different optical components and oblige support structure manufacturers to adapt their products according to the types of optical component that will be inserted in them.

The invention solves these alignment problems in that it proposes an assembly method in which the position of the vertical bearing point of each optical component is defined relative to the position of the optical axis of its waveguide.

SUMMARY OF THE INVENTION

The invention consists in a method of assembling an optical module comprising at least one first optical component and one second optical component having respective first and second waveguides, said first and second waveguides being optically coupled to each other, positioning of said first waveguide relative to said second waveguide relying on first and second contact surfaces respectively on said first and second optical components, said first contact surface cooperating with said second contact surface, wherein said first contact surface includes a vertical bearing plane in the same horizontal plane as said optical axis of said first waveguide and said second contact surface includes a vertical bearing plane in the same horizontal plane as said optical axis of said second waveguide.

The assembly method in accordance with the invention can be used to align the waveguides of a plurality of optical components of different kinds and whose size and location vary from one component to another on a common support structure. The method is independent of the position and the size of the waveguides in the various optical components.

Other features and advantages of the invention will become apparent on reading the following description given by way of illustrative and non-limiting example and with reference to the accompanying drawings.

BRIEF DESCRIPTION OF THE DRAWINGS

FIG. 1, already described, is a diagrammatic exploded perspective view of a conventional optical module formed on an SiO$_2$/Si support structure.

FIGS. 2A and 2B, already described, are diagrammatic representations of the front face of two optical components respectively separate and assembled in the optical module from FIG. 1.

FIGS. 3A and 3B, already described, are diagrammatic representations of the front face of two optical components respectively separate and assembled in another conventional optical module formed on an SiO$_2$/Si support structure.

FIG. 4, already described, is a diagrammatic exploded perspective view of a conventional optical module on an Si support structure.

FIG. 8 is a diagrammatic exploded perspective view of the module from FIGS. 7A and 7B.

FIGS. 9A through 9D are diagrammatic representations of the front face of the support structure of the module from FIG. 8 during various steps of the fabrication process.

FIGS. 10A and 10B are diagrammatic representations of the front face of two optical components respectively separate and assembled in a different embodiment of an optical module.

FIGS. 11A to 11D are diagrammatic representations of the front face of the support structure of the module from FIGS. 10A and 10B during various steps of the fabrication process.

DETAILED DESCRIPTION OF THE PREFERRED EMBODIMENTS

Figure 7A:
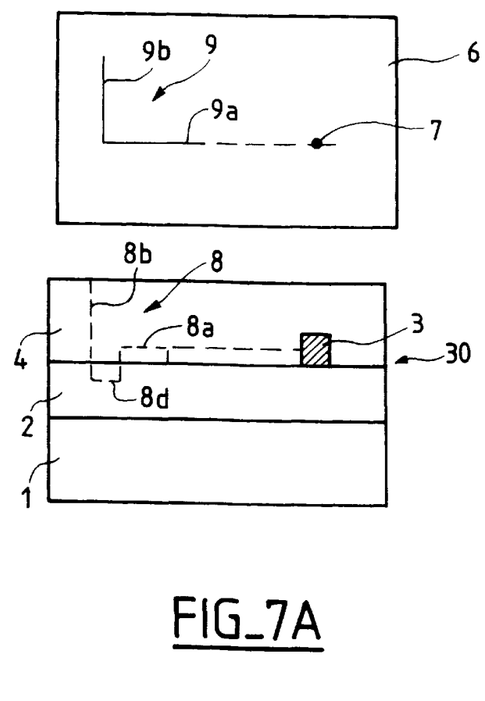
FIGS. 7A and 7B are diagrammatic representations of the front face of two optical components respectively separate and assembled in an optical module in accordance with the invention.
Figure 7B:
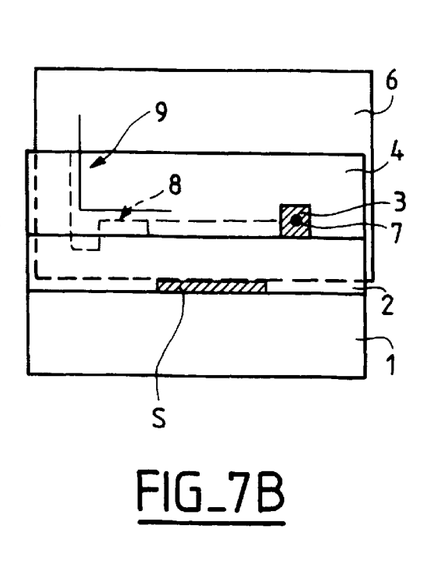

FIGS. 7A and 7B are diagrammatic representations of the front face of two optical components respectively separate and assembled in an optical module in accordance with the invention. FIG. 8 is a diagrammatic exploded perspective view of the same optical module. In this example, only two optical components are shown, but a module in accordance with the invention can include many more than two components. The optical module shown in FIGS. 7A and 7B is formed on an SiO$_2$/Si support structure. A first optical component 30 comprising an active stripe, or waveguide 3, buried in a cladding layer 4, is integrated into the support structure. The same reference numbers are used as in FIGS. 1 to 3B to designate the same items.

In this module, the contact surfaces of each element are defined relative to the optical axis of each waveguide to enable reliable and very accurate alignment of the guides. Accordingly, the contact surface 8 of the first optical component 30 is formed so that its vertical bearing plane 8a is projected at mid-height of the thickness of the optical waveguide 3, i.e. so that its vertical bearing plane is in the same horizontal plane as the optical axis A3 of the waveguide 3.

Similarly, the vertical bearing plane 9a of the contact surface 9 of the second optical component 6 is defined so that it is in the same plane as the optical axis A7 of the waveguide 7.

In this case, when the contact surface 9, and in particular the vertical bearing claim 9a of the second optical component 6, is superposed on the vertical bearing plane 8a defined in the SiO$_2$/Si support structure, the optical axes A3, A7 of the two waveguides 3 and 7 are perfectly aligned in the heightwise direction.

The spot of solder S on the substrate, which is on the bottom of the trench 5 in the SiO$_2$/Si support structure, therefore now has only the function of attaching the second optical component 6 and there is no need to control its height to adjust the vertical alignment of the waveguides 3 and 7.

With regard to the transverse alignment, along the y axis, the position of the corresponding bearing plane is defined at the time of etching the contact surface which is carried out at the same time as that of the waveguide, with a single mask, using the well-known auto-alignment method. This process is described in more detail hereinafter with reference to FIGS. 9A to 9D.

The first contact 8 of the first optical component 30 is in the trench 5 in the SiO$_2$/Si support structure. The length L8 of the contact surface 8 is less than or equal to the length L5 of the trench 5. A bottom part of the second optical component 6 is hollowed out, as shown cross-hatched in FIG. 8, to define a contact surface 9 including a vertical bearing plane 9a and a lateral bearing plane 9b, the length L9 of which partially overlaps the length L8 of the contact surface 8 defined on the SiO$_2$/Si support structure. The contact surface 9 is shown in thick black line in FIG. 8. It is formed so that the vertical bearing plane 9a is in the same plane as the optical axis A7 of the waveguide 7.

Accordingly, when the second optical component 6 is fixed into the trench 5 in the SiO$_2$/Si support structure, the contact surface 9 cooperates with the contact surface 8 of the SiO$_2$/Si support structure. The vertical bearing planes 8a and 9a are superposed so that the optical axis A7 of the waveguide 7 of the second optical component 6 is perfectly aligned with the optical axis A3 of the waveguide 3 of the first optical component defined in the SiO$_2$/Si support structure.

One method of fabricating the SiO$_2$/Si support structure, shown in FIGS. 9A to 9D, begins with stacking over all the surface of the silicon substrate 1 (FIG. 9A) two first silica layers 2, 3 (FIG. 9B). Next the second silica layer 3 is etched to form simultaneously the active stripe, or waveguide 3, and the contact surface 8 comprising the vertical bearing plane 8a and the lateral bearing plane 8b (FIG. 9C). The contact surface 8 of the SiO$_2$/Si support structure is therefore made of the same material as the waveguide 3 but its function is to provide a mechanical bearing plane, rather than an optical function. This etching is carried out using a single mask and the well-known auto-alignment method. Accordingly, the lateral position of the contact surface along the y axis is perfectly defined relative to the position of the optical axis of the waveguide 3. The contact surface 8 is protected by a stop layer 21. A cladding layer 4 is then deposited to bury the waveguide (FIG. 9D). Finally, a final step that is not shown consists in etching cladding layer 4 and the silica layers 2, 3 to form the trench in the SiO$_2$/Si support structure. Because the contact surface 8 has previously been protected by means of the stop layer 21, it is not etched at the same time as the trench.

The same process is applied in the case of the second optical component 6 for which the contact surface 9 is formed by etching at the same time as the waveguide 7.

Because of the assembly method of the invention, it is possible to change the active structure of an optical component without interfering with the quality of the alignment of the waveguide. Consequently, the waveguide 3 of the optical component 30 integrated into the SiO$_2$/Si support structure can be aligned with the waveguide of a loser, an amplifier, a photodetector or any other optical component without it being necessary to modify and adapt the SiO$_2$/Si support structure to suit the optical components to be inserted. The assembly method in accordance with the invention is independent of the position of the waveguides in the optical components and the size of the waveguides. Consequently, the assembly method in accordance with the invention can be used to align a plurality of optical components, in cascade or in parallel, and of different natures, on a common support structure.

FIGS. 10A and 10B are diagrammatic representations of a different embodiment of an optical module on an SiO$_2$/Si support structure. In this case the module further includes a compensation layer 20. The contact surface of the SiO$_2$/Si support structure includes a lateral bearing plane 8b on which the lateral bearing plane 9b of the second optical component is to bear. At least one abutment is defined on the first optical component 30. This abutment has horizontal and vertical walls that respectively constitute the vertical bearing plane 8a and the lateral bearing plane 8b of the contact surface 8. The vertical wall of the abutment defined in the SiO$_2$Si support structure has a height h2 above the horizontal wall. The height h2 must necessarily have a minimum value to enable the second optical component 6 to seat correctly and to prevent it from being displaced. Given that the horizontal wall is at mid-height in the thickness of the waveguide 3, and that the abutment is formed in the same silica layer as that which defines the guide 3, the height h2 of the vertical wall of the abutment is necessarily equal to half the thickness of the waveguide 3.

The height h2 of the vertical wall is therefore related to the thickness of the waveguide 3. If the waveguide 3 is thin, for example if its thickness is in the order of 6$\mu$m, the height h2 of the vertical wall of the abutment is only 3 $\mu$m and may be insufficient to obtain correct seating of the second optical component 6. To obtain an acceptable height h'2 the invention therefore proposes to add a compensation layer 20 horizontally over part of the abutment to raise the vertical wall.

FIGS. 11A to 11D are diagrammatic representations of the method of fabricating the module including this compensation layer 20. It begins by stacking successively over all the surfaces of the Si substrate 1 (FIG. 11A) two silica layers 2, 3 and a compensation layer 20 (FIG. 11B). The compensation layer 20 and the second silica layer 3 are then etched to form simultaneously the waveguide 3 and the abutment (FIG. 11C). The abutment is protected by a stop layer 21. The compensation layer 20 advantageously has an optical index n identical to that of the cladding layer 4 that is deposited next to bury the guide 3 (FIG. 11 D). Consequently, the compensation layer has no optical effect on the operation of the waveguide. A final step that is not shown consists in defining the trench in the module by etching the cladding layer 4, compensation layer 20 and silica layers 3, 2. The abutment remains intact during this etching because it is protected by the previously deposited stop layer 21.

Figure 12A:
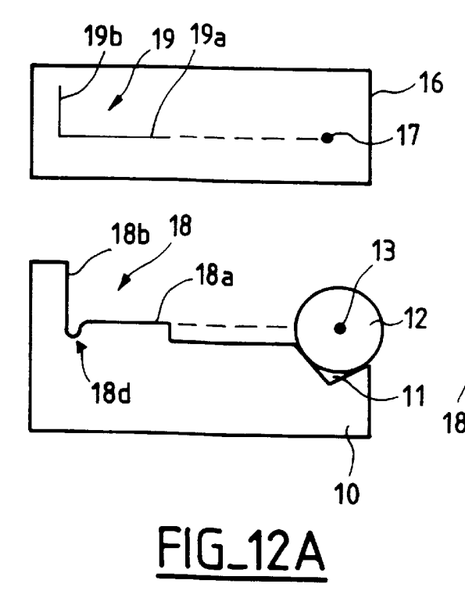
FIGS. 12A and 12B are diagrammatic representations of the front face of two optical components respectively separate and assembled in another optical module in accordance with the invention.
Figure 12B:
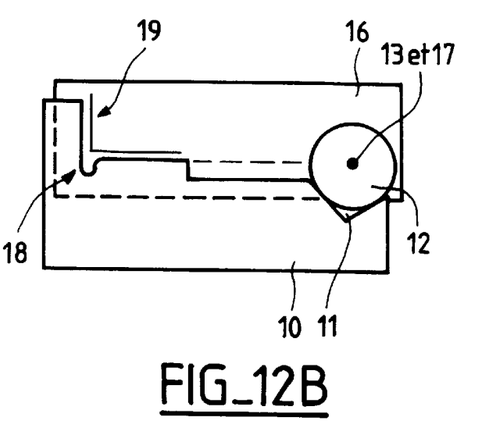
Figure 13:
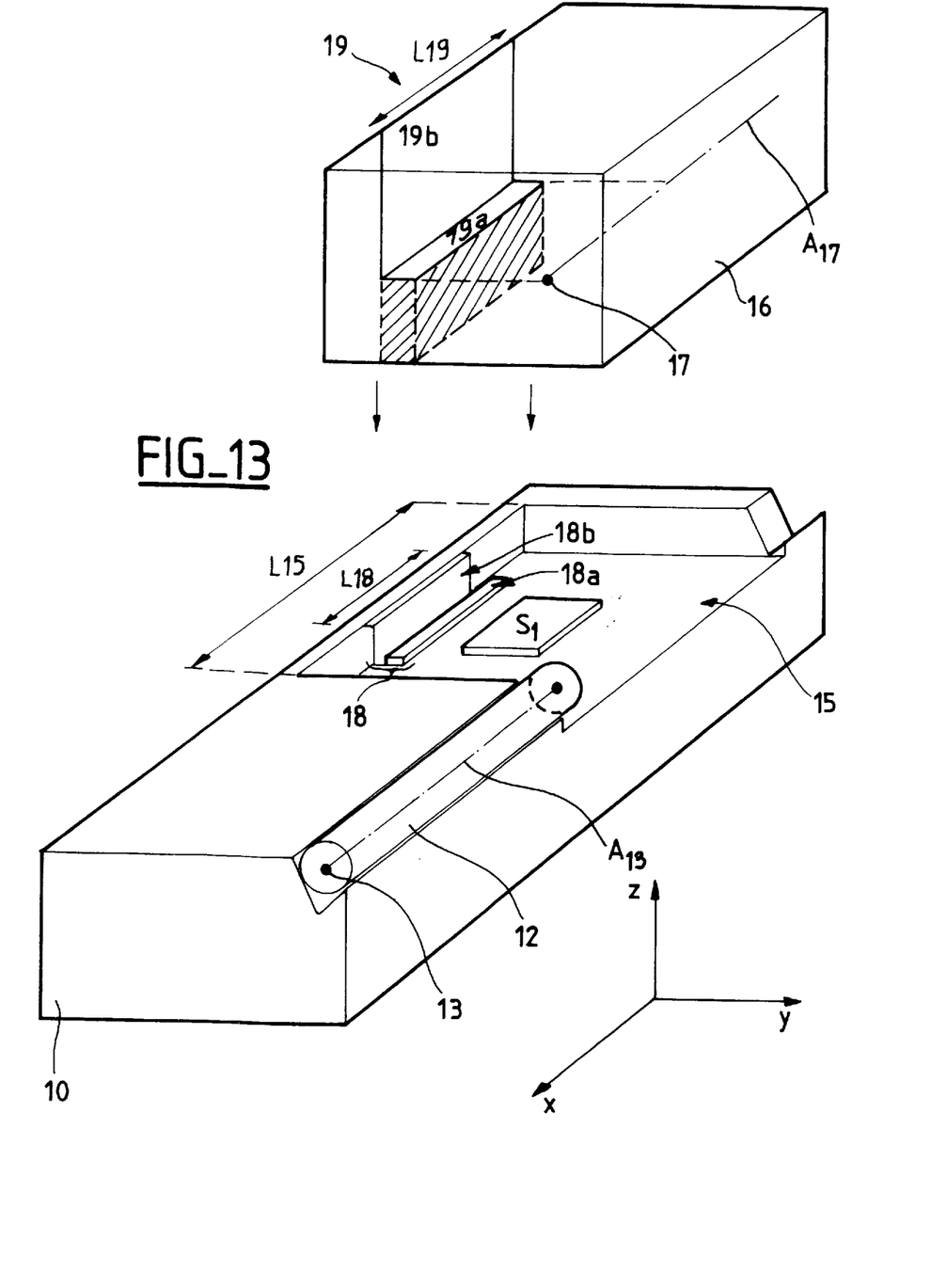
FIG. 13 is a diagrammatic exploded perspective view of the module from FIGS. 12A and 12B.

FIGS. 12A and 12B are diagrammatic representations of the front face of two optical components respectively separate and assembled in another optical module to which the invention also applies. This module is formed on an Si support structure 10 and includes an optical fiber 12 as a first optical component. FIG. 13 is a diagrammatic exploded perspective view of the same module.

The vertical bearing plane 18a of the contact surface 18 of the support structure Si is defined so that it is in the same horizontal plane as the optical axis A13 of the core 13 of the optical fiber 12. To this end, the position of the vertical bearing plane 18a is defined relative to the apex of the V-shaped groove, which defines the final position of the optical fiber 12 and therefore of its core 13.

Just as in the module formed on an SiO$_2$/Si support structure, the only function of the spot of solder Si on the bottom of the trench 15 is to attach the second optical component 16.

The contact surface 18 formed on the Si support structure is etched at the same time as the V-shaped groove 11 and the contact surface 19 formed on the second optical component 16 is etched at the same time as the waveguide 17.

The height of the lateral bearing plane 18b is such as to immobilize the optical component 16. This same component could be hybridized either on the Si substrate 10 etched in this manner or on the $SiO_2$/Si substrate 1, possibly provided with the compensation layer 21.

The shape of the mechanical bearing planes formed on the support structure, whether it is an $SiO_2$/Si support structure or an Si structure, is important for accurate transverse alignment, along the y axis.

Figure 6A:
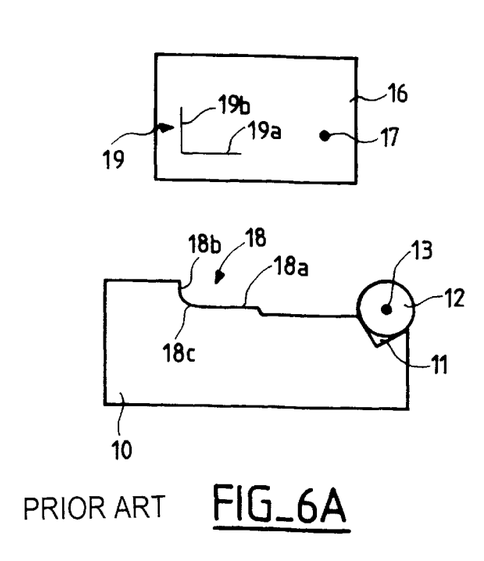
FIGS. 6A and 6B, already described, are diagrammatic representations of the front face of two optical components respectively separate and assembled in another conventional optical module formed on an Si support structure.
Figure 6B:
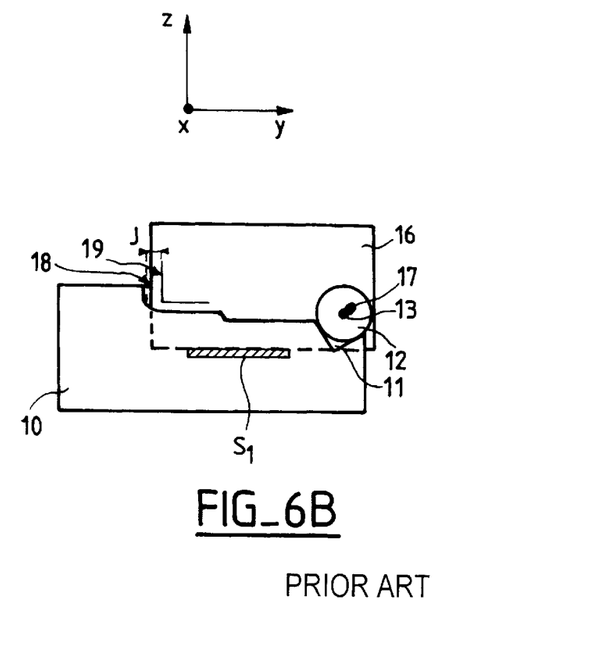

When the lateral bearing plane 18b is etched in a conventional Si support structure, for example, the bottom of the etch always has a rounded shape 18c, as shown in FIGS. 6A and 6B. The contact surface 19 of the second optical component 16 is therefore prevented from seating exactly on the intersection of the lateral bearing plane 18b and the vertical bearing plane 18a, because of the presence of this fillet. Consequently, in conventional modules, a clearance J appears, along the y axis, within which the second optical component can move, and this prevents accurate transverse alignment, along the y axis.

To eliminate this clearance along the transverse axis, the invention proposes to form a contact surface 8; 18 on the support structure of the first optical component including a furrow 8d; 18d. The furrow 8d; 18d still has a rounded bottom etch, but this is outside the vertical bearing plane 8a; 18a and the lateral bearing plane 8b; 18b. This particular shape of the contact surface 8; 18 therefore enables exact location of the contact surface 9; 19 of the second optical component 6; 16 at the intersection of the vertical bearing plane 8a; 18a and the lateral bearing plane 8b; 18b and consequently very accurate transverse alignment.

What is claimed is:

1. A method of assembling an optical module, comprising the steps of:
    providing at least one first optical component and one second optical component having respective first and second waveguides; said first optical component having a first contact surface, including a first vertical bearing plane in a same horizontal plane as an optical axis of said first waveguide; said second optical component having a second contact surface, including a second vertical bearing plane in a same horizontal plane as an optical axis of said second waveguide; and
    optically coupling said first and second waveguides to each other by positioning said first waveguide relative to said second waveguide and relying on a cooperation of said first and second contact surfaces, respectively, to determine an alignment of said first and second waveguides.

2. The assembly method as claimed in claim 1, wherein there is formed on said first optical component at least one abutment having horizontal and vertical walls that respectively constitute said vertical bearing plane and a lateral bearing plane, and wherein a compensation layer is disposed horizontally over a portion of said abutment so as to raise said vertical wall.

3. The assembly method as claimed in claim 1, wherein said first optical component is integrated into a silica-on-silicon support structure.

4. The assembly method as claimed in claim 1, wherein said first optical component is an optical fiber disposed on a silicon support structure.

5. An assembly method as claimed in claim 3, wherein said contact surface of said first optical component includes a furrow having a rounded bottom extending below said vertical bearing plane.

6. The assembly method as claimed in claim 4, wherein said contact surface of said first optical component includes a furrow having a rounded bottom extending below said vertical bearing plane.

7. The assembly method as claimed in claim 1, further including at least one other optical component of a different kind optically coupled in cascade or in parallel with said second and/or said first optical component.

8. The assembly method according to claim 1, wherein said step of optically coupling said first and second waveguides involves abutting said first vertical bearing plane against said second vertical bearing plane.

9. The assembly method according to claim 8, wherein said first contact surface and said first waveguide are made from a same material.

10. The assembly method according to claim 9, wherein said first contact surface and said first waveguide are made by an etching process using a single mask.

11. An optical module, comprising:
    a first optical component comprising a first waveguide and a first contact surface, said first waveguide having a first optical axis, said first contact surface having a first vertical bearing plane in a same horizontal plane as said first optical axis;
    a second optical component comprising a second waveguide and a second contact surface, said second waveguide having a second optical axis, said second contact surface having a second vertical bearing plane in a same horizontal plane as said second optical axis; and
    wherein said first and second waveguides are optically coupled with said first contact surface cooperating with said second contact surface to determine an alignment of said first and second waveguides.

12. The optical module according to claim 11, wherein said first vertical bearing plane abuts against said second vertical bearing plane.

13. The optical module according to claim 12, wherein said first contact surface and said first waveguide are made from a same material.

14. The optical module according to claim 13, wherein said first contact surface and said first waveguide are made by an etching process using a single mask.

15. The optical module according to claim 11, wherein said first optical component is integrated into a silica-on-silicon support structure.

16. The optical module according to claim 11, wherein said first optical component is an optical fiber disposed on a silicon support structure.

17. The optical module according to claim 14, wherein said contact surface of said first optical component includes a furrow having a rounded bottom extending below said vertical bearing plane.

18. The optical module according to claim 15, wherein said contact surface of said first optical component includes a furrow having a rounded bottom extending below said vertical bearing plane.

19. The optical module according to claim 11, further including at least one other optical component of a different kind optically coupled in cascade or in parallel with said second and/or said first optical component.

* * * * *